US008214797B2

(12) United States Patent
Cote et al.

(10) Patent No.: US 8,214,797 B2
(45) Date of Patent: Jul. 3, 2012

(54) VISUAL ASSOCIATION CREATION FOR OBJECT RELATIONAL CLASS DEVELOPMENT

(75) Inventors: Antoine Cote, Bellevue, WA (US); Lance Chadwick Delano, Redmond, WA (US); Andrew Joseph Crawley, Redmond, WA (US); Young Kun Joo, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 1308 days.

(21) Appl. No.: 11/669,966

(22) Filed: Feb. 1, 2007

(65) Prior Publication Data

US 2008/0189677 A1    Aug. 7, 2008

(51) Int. Cl.
*G06F 7/00* (2006.01)
*G06F 9/44* (2006.01)

(52) U.S. Cl. ........ 717/109; 717/105; 717/113; 717/118; 717/121; 707/694; 707/703; 707/740; 707/748

(58) Field of Classification Search ........................ None
See application file for complete search history.

(56) References Cited

U.S. PATENT DOCUMENTS

| | | | |
|---|---|---|---|
| 5,159,687 A | 10/1992 | Richburg | |
| 5,499,371 A | 3/1996 | Henninger et al. | |
| 5,596,746 A * | 1/1997 | Shen et al. ............................ | 1/1 |
| 5,659,723 A | 8/1997 | Dimitrios et al. | |
| 5,706,506 A * | 1/1998 | Jensen et al. ........................ | 1/1 |
| 5,797,137 A | 8/1998 | Golshani et al. | |
| 5,850,544 A * | 12/1998 | Parvathaneny et al. ....... | 717/108 |
| 5,893,108 A | 4/1999 | Srinivasan et al. | |
| 5,937,189 A | 8/1999 | Branson et al. | |
| 6,035,300 A * | 3/2000 | Cason et al. ........................ | 1/1 |
| 6,163,776 A | 12/2000 | Periwal | |
| 6,189,012 B1 * | 2/2001 | Mital et al. ..................... | 717/165 |
| 6,240,422 B1 * | 5/2001 | Atkins et al. ................... | 719/315 |
| 6,324,682 B1 * | 11/2001 | McComb et al. ............. | 717/104 |
| 6,343,265 B1 | 1/2002 | Glebov et al. | |
| 6,456,995 B1 * | 9/2002 | Salo et al. ..................... | 707/703 |
| 6,487,452 B2 * | 11/2002 | Legay ............................. | 607/32 |
| 6,591,275 B1 | 7/2003 | Russell et al. | |
| 6,609,133 B2 | 8/2003 | Ng et al. | |
| 6,714,219 B2 | 3/2004 | Lindhorst et al. | |
| 6,754,670 B1 | 6/2004 | Lindsay et al. | |
| 6,938,038 B2 * | 8/2005 | Weinberg et al. ..................... | 1/1 |
| 6,990,492 B2 * | 1/2006 | Gupta ................................. | 1/1 |
| 7,096,224 B2 | 8/2006 | Murthy et al. | |
| 7,103,527 B2 | 9/2006 | Rajarajan et al. | |
| 7,512,633 B2 * | 3/2009 | Cohen et al. ......................... | 1/1 |
| 7,577,681 B1 * | 8/2009 | Rozenman et al. ................... | 1/1 |
| 7,580,947 B2 * | 8/2009 | Kasravi et al. ....................... | 1/1 |
| 2004/0049736 A1 | 3/2004 | Al-Azzawe et al. | |
| 2004/0107183 A1 | 6/2004 | Mangan | |
| 2005/0086238 A1 * | 4/2005 | Nevin, III .................... | 707/100 |
| 2005/0125388 A1 * | 6/2005 | Karve et al. ..................... | 707/3 |

(Continued)

OTHER PUBLICATIONS

West Virginia University, "Microsoft Access: Relational Database Design", pp. 1-20.*

(Continued)

*Primary Examiner* — Isaac Tecklu
(74) *Attorney, Agent, or Firm* — Workman Nydegger

(57) ABSTRACT

A development system is provided. The system includes a workspace component to visually display one or more class components. A linking component identifies a database relationship between at least two of the class components, where the database relationship is employed to automatically create a class association between the at least two class components.

20 Claims, 10 Drawing Sheets

U.S. PATENT DOCUMENTS

| | | | |
|---|---|---|---|
| 2005/0289119 A1* | 12/2005 | Weinberg et al. | 707/2 |
| 2006/0074942 A1 | 4/2006 | Shaburov | |
| 2007/0142961 A1* | 6/2007 | Bhasin et al. | 700/216 |
| 2007/0185830 A1* | 8/2007 | Rubel | 707/2 |

OTHER PUBLICATIONS

Designing Data Model by Entity Relationship Diagram. http://www.visual-paradigm.com/edocs.jsp?url=content/product/dbva/dbva3DesignerGuide/pdf/dbva_designer_guide_chapter4.pdf&resourceType=document&resourceDetail=dbva3UserGuide. Last accessed Nov. 17, 2006.

Seth Grimes. Modeling Object/Relational Databases. DBMS, Apr. 1998. http://www.dbmsmag.com/9804d13.html. Last accessed Nov. 17, 2006.

Kari Alho. A design data manager. ACM, 1988. http://delivery.acm.org/10.1145/60000/50226/p202-alho.pdf?key1=50226&key2=1420673611&coll=ACM&dl=ACM&CFID=6365576&CFTOKEN=61458884. Last accessed Nov. 17, 2006.

Persistence® Edgextend™ for C++ Programming Guide. Version 8.0, Apr. 2003. Persistence Software Inc. http://www.progress.com/realtime/techsupport/documentation/edgextend_for_cplusplus/80/docs/programming.pdf. Last accessed Nov. 3, 2006.

Assisted SOA Development Research Report. The Middleware Company. Nov. 2004. http://xml.coverpages.org/OracleAssisted-SOA-Development.pdf. Last accessed Nov. 3, 2006.

Alister Jones. Implementing Raw Templating—Part 2. http://somenewkid.blogspot.com/2006_06_01_somenewkid_archive.html. Last accessed Nov. 3, 2006.

\* cited by examiner

VISUAL ASSOCIATION CREATION FOR OBJECT RELATIONAL CLASS DEVELOPMENT

BACKGROUND

Integrated development environments (IDEs) provide a common platform and design tools for modern software development. While software is often the most time-consuming and highest risk aspect of electronic program development, it also holds the greatest potential to enhance a design for multiple target applications. Such design tools allow designers to efficiently develop code where graphical user interfaces (GUI) automates and simplifies the configuration of complex programming projects. These tools also enable designers to create source code by enhancing code readability and simplifying code writing. For instance, source code editor features may include syntax coloring, auto-indenting, and shortcut menus that link stored procedure calls to their definitions, declarations, and usages even when these references reside in separate files. Other aspects of the tools include simulation resources to allow designers to develop and debug applications when hardware resources are scarce or unavailable.

One area of software development that is performed on IDEs includes mapping class objects to relational objects, referred to as O/R mapping, and is the latest advancement in modern day programming technologies. It improves the productivity of programmers by many degrees while providing flexibility to adapt to changing business needs. While O/R technology itself provides many benefits to programmers, enabling O/R classes to be created and set up correctly is not an easy task for normal development nor is it well-supported in current programming tools. Without providing adequate tools support, programmers trying to adopt the technology may be forced to write their respective code manually.

One purpose driving O/R technologies is the need to interface the relational database world with the models supported in the object oriented programming world. For example, relational database management systems (RDBMS) supporting the relational database predated the popularization of object-oriented programming in the 1990s. Using relational databases to store object-oriented data leads to a semantic gap where programmers would be required to allow their software to function in two different worlds—processing of data would be performed in object-oriented form, but the same data would have to be stored in relational form.

Requiring this constant conversion between two different forms of the same data not only had the effect of stifling performance, but imposed difficulties to the programmer as the relational or object-oriented forms would impose limitations on each other. For example, relational databases make complicated associations difficult, and they tend to "map" poorly into the object oriented world since they fail to implement the relational model's user-defined types. This problem is sometimes referred to as the Object-Relational impedance mismatch.

Generally, relational databases use a series of tables representing simple data, where optional or related information is stored in other tables. A single (persistent object) record in the database often spans several of these tables, and requires a join to collect all of the related information back into a single piece of data for processing. This would be the case for an address book example, which would likely include at least a user and address table, but perhaps even a phone number table as well. In the object world, there is a clear sense of "ownership", where a particular person object owns a particular phone number in the above example. This is not the case in relational databases, where the tables have no understanding how they relate to other tables at a fundamental level. Instead, the user must construct a "query" to gather information together. Queries not only request what information to return but also need to know how the tables involved are related to each other, illustrating the point that tables do not know their relationships when they are residing in the database. Thus, these relationships are typically only known when a query is run to specify the relationships. Relational databases (which attempt to implement the Relational Model), do maintain relationships via constraints but the Sequential Query Language (SQL), for example, is generally unaware of these.

When creating Object/Relational (O/R) classes by mapping class objects to database objects, it is important to also set correct associations between related objects so that applications written on top of these objects can easily take advantage of such relationships. Hand-coding such relationship is not a trivial task for typical developers. While the O/R technology itself provides a lot of benefits to programmers, manually having O/R classes created and set up correctly is not a straight-forward or simple task. With current development tools support, programmers trying to adopt O/R technology are often forced to write code manually which detracts from the utility of such tools.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A development environment and visual workspace is provided where class associations are automatically determined and created to facilitate automated software development. In an aspect, graphical tools are provided that allow dragging (or other computer control) of database objects such as tables onto a workspace for further program development, where a class is automatically constructed for the respective objects. An automated analysis is performed to determine if a link or links exist with existing classes that also appear on the workspace. For example, the analysis may determine if foreign-key relationships existed between related tables (or other database objects) in the database. When a table or other database object is then moved into the workspace, in addition to creating a class for the table, class relationships to other classes are then automatically created and mapped between classes based upon the determined foreign-key relationships in the database. In this manner, the automated mappings and determinations mitigate developers having to determine and create object/relational mappings by hand.

In one aspect, when a user drags a second related table onto the workspace, an object/relational (O/R) tool such as a software designer automatically creates an O/R class association between the two classes (more than two classes can have mapped relationships). It can create both a collection on a parent class and pointer reference on a child class (or classes), for example. For example, if a database has two tables, Orders and Order Details and there is a foreign key describing a link between Order Details to Orders in the database. With an Orders class already created on the workspace for example, and if the user then drags Order Details onto the workspace, this movement into the workspace automatically creates an Order Details class and an association between Orders and Order Details.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A graphical design environment is provided that enables automated mappings or associations to be generated between object/relational classes. In one aspect, a development system is provided. The system includes a workspace component to visually display one or more class components. A linking component identifies a database relationship between at least two of the class components, where the database relationship is employed to automatically create a class association between the at least two class components.

As used in this application, the terms "component," "tool," "class," "database," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
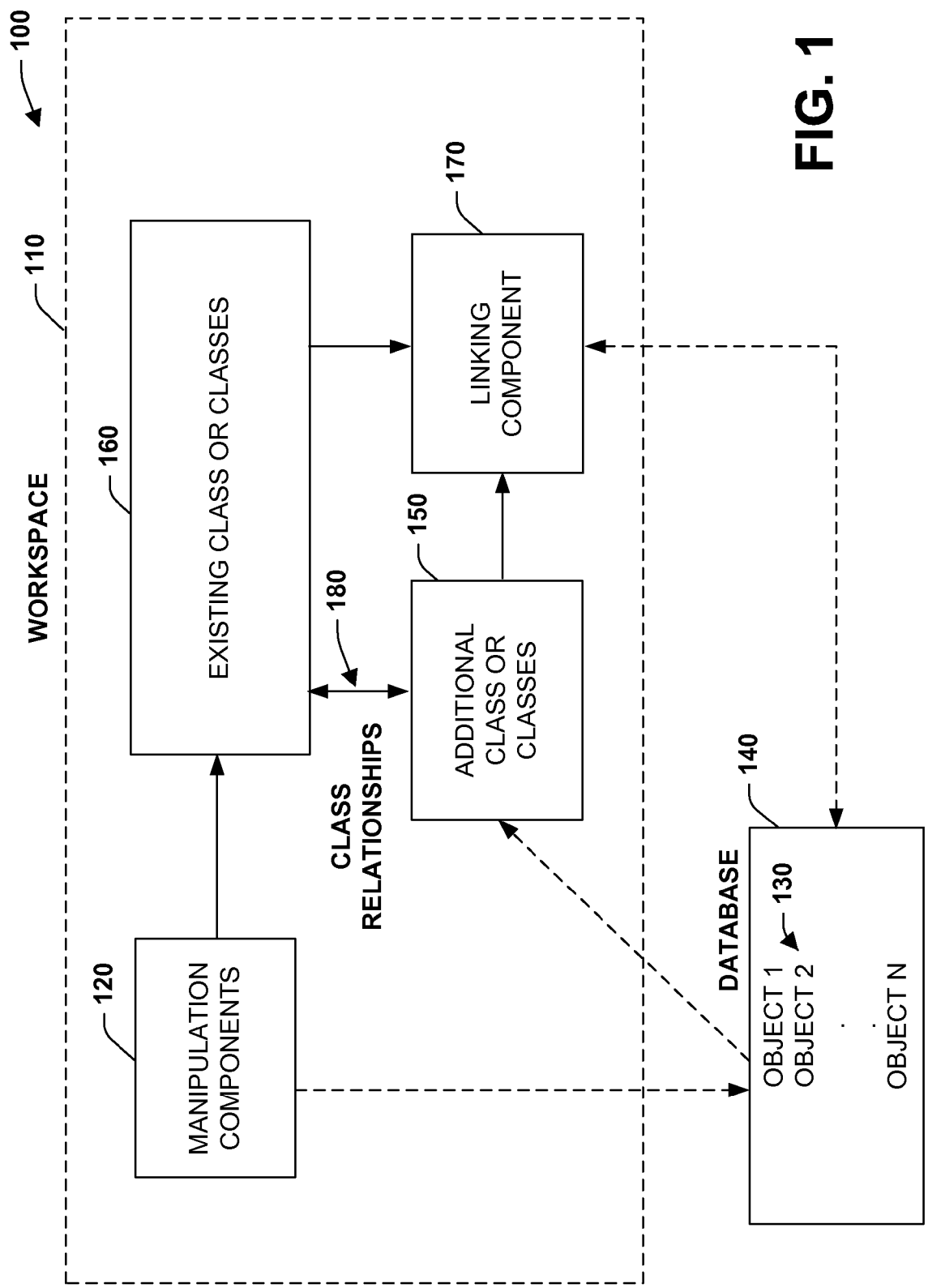
FIG. 1 is a schematic block diagram illustrating a visual development system.

Referring initially to FIG. 1, a visual development system 100 is illustrated to facilitate automated mapping and component development. A work space 110 is provided where developers can create components for an application. Such workspace 110 can be associated with a computer or workstation such as an Integrated Development Environment (IDE), for example, having a display where components can be created and operated upon. Within the workspace 110, one or more manipulation components 120 can be provided that enable developers to visually select and perform operations on a plurality of differing types of components. This can include selecting one or more database objects 130 from a database 140 via the manipulation components 120 and locating the objects at reference numeral 150 within vicinity of one or more existing class components 160 (e.g., drag component and drop in workspace). For example, the manipulation component 120 may be a computer cursor that selects the database objects 130 and drags the objects such that it visually contacts a portion of the workspace 110. As shown, the database objects 130 when dragged onto the workspace 110 become an additional class or classes at 150. It is to be appreciated that other actions than drag and drop can be applied by the manipulation components 120 as will be described in more detail below.

A linking component 170 is automatically analyzed by the workspace 110 (or components associated with the workspace). For instance, the linking component 170 may be a foreign key associated with the database objects 130 that describes a previous database object relationship between the existing classes 160 and the additional class 150 that is presently created from such objects. If such relationship is detected, class relationships and associations between the existing classes 160 and the additional classes 150 are automatically created at 180. By automatically creating class relationships, hand coding of such associations is mitigated.

The concept of mapping class objects to relational objects, referred to as O/R mapping, is the latest advancement in modern programming technologies. It improves the productivity of programmers by while providing flexibility to adapt to changing needs. While the technology itself provides benefits to programmers, having O/R classes created and set up correctly is not a straight-forward task for developers. The workspace 110, manipulation components 120, and determined class relationships at 180, mitigate programmers having to develop code manually to define such relationships. The system 100 solves this by providing the workspace 110 and automated controls to visually create the classes 150 via drag and drop or other type of manipulation components 120.

In one aspect, the workspace 110 facilitates software development by automatically creating object/relational (O/R) relationships between related O/R classes and generating related code. When a new database object 130 is added to the workspace 110 via drag and drop, for instance, and if there is an existing O/R class 160 that has a relationship to this newly dropped object at the database schema level for example, the workspace 110 can automatically create relationships 180 between the classes and generate suitable code to represent those relationships. When creating relationships between related O/R classes, a collection representing at least one child class is created in the parent class and a pointer reference to the parent class can be added to the child class. For instance, the existing class 160 may be considered the parent class and the additional class 150 may be considered the child class.

As an example of class relationships 180, when an Order Details table is dropped on the workspace at 150 which already includes an Orders class at 160, the workspace 110 not only creates an Order Details class at 150, but also a class relationship at 180 between Orders 160 and Order Details 150 since there is a foreign key relationship (or other linking component) between at least two objects 130 in the database 140. By automatically creating the relationships 180, value can be added to a business by enabling less skilled programmers to create O/R based applications using various O/R technologies (e.g., LINQ to SQL). In another aspect, the system 100 includes an object/relational development system. This includes means for displaying one or more class components (e.g., workspace 110) and means for determining a database relationship (e.g., linking component 170) between a subset of the class components, where the database relationship is employed to automatically create a class association between the subset of the class components.

As can be appreciated, other methods can be provided for creating associations than drag and drop operations. For example, a wizard can be provided that allows the user to pick what database objects to include on the workspace 110 or designer. When the user has completed the wizard, it can create a new designer file or modify an existing one. In these examples, the wizard is able to create classes and associations as needed. In another aspect, a window can be provided that shows the objects in the database and can show the foreign key constraints that are present in the database. The user could then drag the constraint onto the designer surface in which case the designer could create the classes and associations. The user can also drop the constraint onto an existing class on the designer to indicate that the existing class should be one of the participants in the association. In general, the designer can employ logic about not creating an association if it is already present. The designer can also detect whether required member properties needed are present before establishing the association. If they are not, a warning can be given to the user or the designer can create the missing member properties on the respective classes. The designer or workspace can also work with composite keys where more than one field on each side participates in the relationship.

In addition to various hardware and/or software components, various interfaces can be provided to manipulate components in the workspace 110. This can include a Graphical User Interface (GUI) to interact with the user or other components such as any type of application that sends, retrieves, processes, and/or manipulates data, receives, displays, formats, and/or communicates data, and/or facilitates operation of the system 100. For example, such interfaces can also be associated with an engine, server, client, editor tool or web browser although other type applications can be utilized.

The GUI can include a display having one or more display objects (not shown) for manipulating objects 130, the classes 150, and classes 160 including such aspects as configurable icons, buttons, sliders, input boxes, selection options, menus, tabs and so forth having multiple configurable dimensions, shapes, colors, text, data and sounds to facilitate operations with the workspace 110. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI. For example, in addition to providing drag and drop operations, speech or facial recognition technologies can be employed to select/locate/move the objects 130 onto the workspace 110 to trigger automated class creations and associations between classes.

Figure 2:
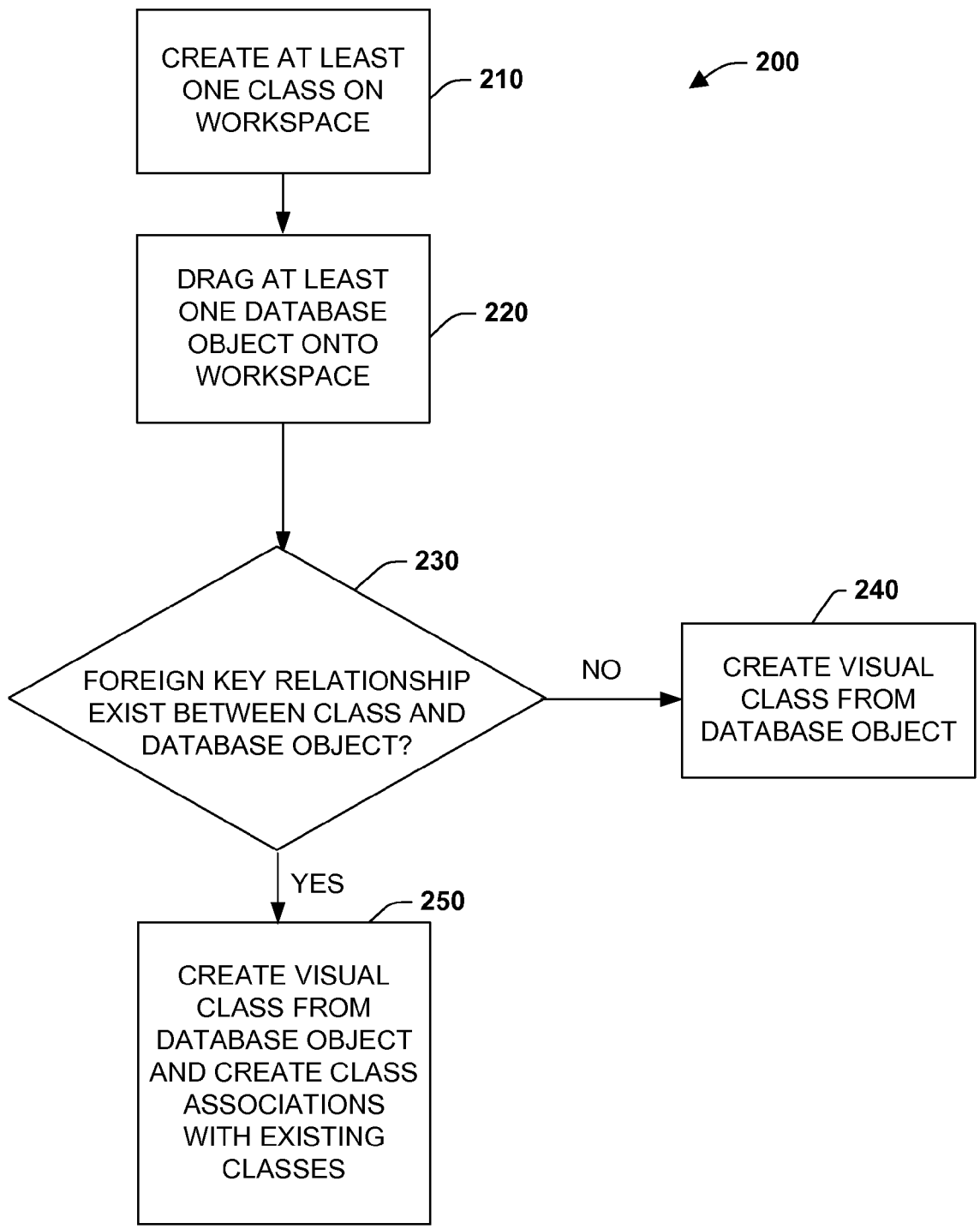
FIG. 2 is a flow diagram that illustrates a process for class development, association, and automated object/relational mappings.

FIG. 2 illustrates exemplary processes 200 for class creation, association, and object/relational mappings. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Proceeding to 210, at least one class is created on a workspace or platform area such as at a computer display area. This can include dragging a relational object onto the workspace whereby components within the workspace automatically create at least one object class from the relational object. For example, the relational object may include a relational database table that is dragged onto the workspace where an object class is created from the respective table. At 220, at least one other relational object is dragged or moved onto the workspace. This could be a subsequent relational table that is dragged into the space where another object class is automatically created. At 230, a decision is made as to whether or not a foreign key relationship (or other linking relationship) exists between the existing class or classes on the workspace and the recently dragged or moved relational object onto the workspace.

If a foreign key relationship does not exist at 230, a visual class component is created on the workspace at 240 and no other relationships or associations are created to other class components that may exist on the workspace. If a foreign key relationship is detected at 230 between the existing class and the object that has been recently moved onto the workspace, then a visual class is created on the workspace at 240 and class associations or relationships are then automatically created between the existing class and the newly created class. Such relationships may include logical relationships such as between elements within a relational table and how such elements relate to another table. Using the example above, an Orders Class may have a relationship with an Orders Details class. As can be appreciated, a plurality of differing relationships may exist between objects. If a foreign key or other link is detected, such relationships will automatically be linked between the respective classes.

Figure 3:
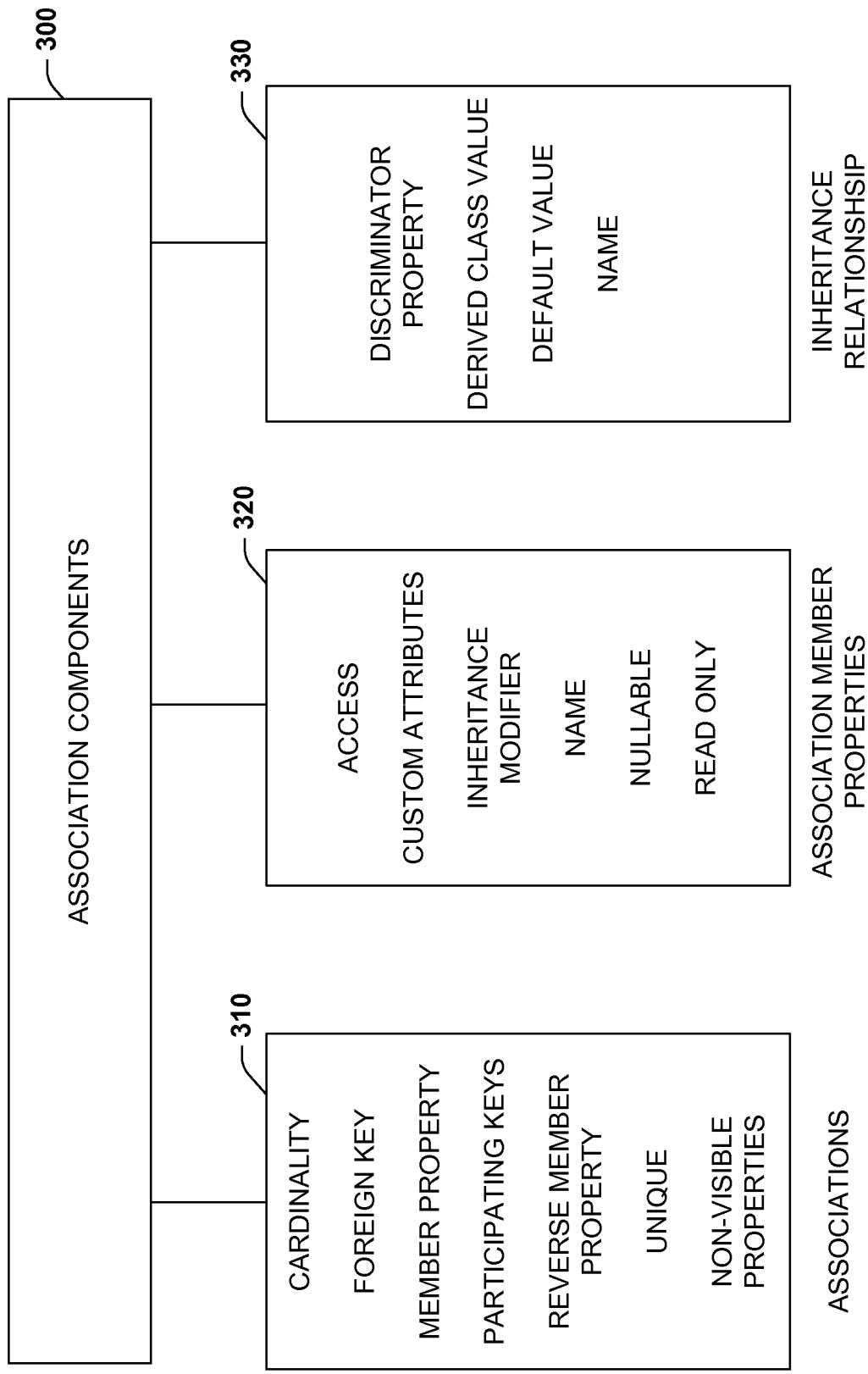
FIG. 3 is a diagram that illustrates example association components for creating relationships between classes.

Referring now to FIG. 3, example association components 300 are illustrated that can be employed for creating relationships between classes. Proceeding to 310, one or more association fields are illustrated. These can include a Cardinality that specifies whether an association is 'One' or 'Many'. This can include a default of 'One' if both sides of a foreign key relationship are unique (e.g., Participating Key (PK) to PK, or PK to an alternate key), otherwise the default can be set for "Many". Another association at 310 is a Foreign Key string that is an identifier for a foreign key in the respective database. This can include a default of a Foreign key relationship name from the data (if reverse engineered), or NULL (if created by drag/drop). Still yet another association 310 is a member property that includes a collection of properties for a member property. Generally, no value is set and can include properties for an auto-generated class member property. Another association 310 includes participating keys that identifies class member properties that represent the respective database columns participating in the foreign key relationship and how they relate to each other. This property can have a builder button that brings up an Association Editor dialog described below. The text displayed in a property cell is of the general form:

className_X.mprop_1, className_Y.mprop_1->
className_X.mprop-N, classname_Y.mprop_N where the member properties are listed how they appear in the dialog, that is: an ordered list of parent pairings.

Another association at 310 includes reverse member properties. These may include a collection of properties for the reverse member property. These properties are typically available if this property is set to true. If set to true, it specifies that there is a "back" reference from the child class to the parent class. And generally controls whether a reference is generated from the child class to the parent. A Unique association at 310 specifies whether the foreign key target has a uniqueness constraint on it.

Other associations at 310 include non-visible properties. These may include an IsForeignKey property that specifies a member property/attribute on the child class that corresponds to a foreign key column. Since there are potentially multiple columns that participate in a foreign key, this property may appear on more than one member property. In practice, there may not be an actual foreign key constraint in the database. Another non-visible property at 310 includes a name that is a property of an association displays. Name can be of the form "ParentClassName_ChildClassName". Thus, if there were an association between Order and Order details for example, the association name could be "Order_OrderDetails".

Proceeding to 320 of FIG. 3, association member properties are considered. In general, member properties are auto-generated for associations. There can be a member property for a collection on a parent class and on the child class (if the "Reverse Member" property is set to true). Member properties for associations 320 typically do not have all of the same properties as general member properties described above since they generally do not map directly to specific database columns. One association member property 320 includes an access property that specifies an access level for the respective type (e.g., public, private, internal, protected). Custom Attributes at 320 are associated with user-defined parameters that can be entered via an attribute editor. An inheritance modifier at 320 lists an inheritance method. A nullable field defines if a reference is optional or not. This value can be set to true if the source columns in the foreign key are nullable. Thus, the corresponding member class properties for the child class are also nullable. A Read Only field defines whether a set accessor is to be generated.

Proceeding to 330 of FIG. 3, inheritance relationship properties are provided. This may include a Discriminator Property that represents a column in a database that is used to discriminate between entities. Another inheritance property 330 can include a derived class value used to discriminate between entities and define a subclass. A Default Value at 330 defines the default for a respective property. A name is a non-visible property of an association. It is of the form "ChildClassInheritsParentClass". For example, an Employee class that inherits from a Person class would have an association that is named "EmployeeInheritsPerson".

Figure 4:
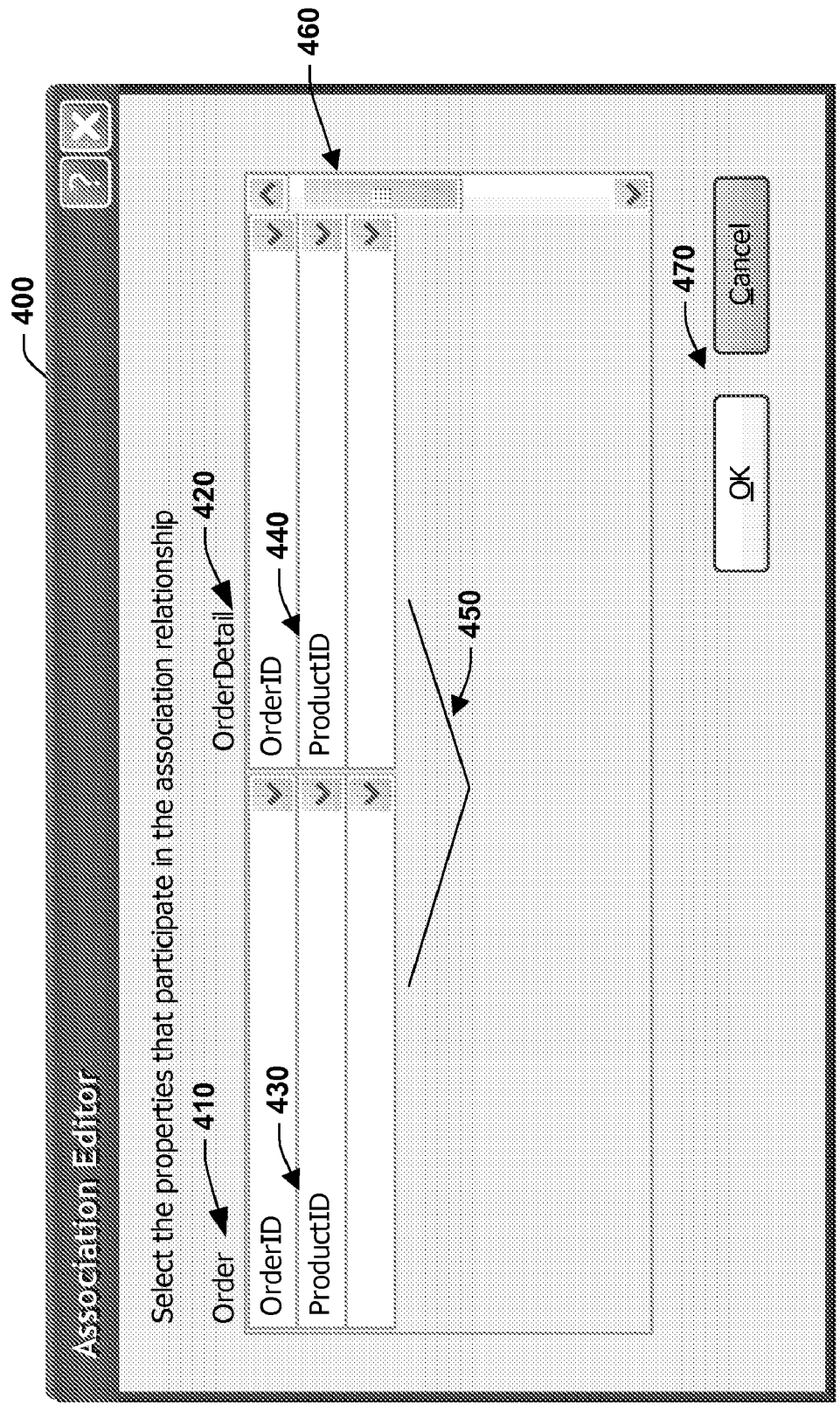
FIG. 4 illustrates an example association editor.

Turning to FIG. 4, an example association property editor 400 is illustrated that can be employed with the respective properties described above in FIG. 3. The association property editor 400 allows users to select properties that participate in an association. It can be used to edit source database properties and also for target class properties. Multiple properties can be selected in the case where a composite key is employed to relate entities (e.g., OrderID and ProductID). Graphic elements on this editor 400 (i.e., not including title, help icon, close icon, OK, and Cancel) include: a Source Class Name at 410 and a Target Class Name at 420. Source Property(ies) 430 and Target Property(ies) 440 can also be provided. At 450, areas are provided for New (Additional) Targets, where a Group scroll bar is provided at 460. Standard OK and Cancel buttons are shown at 470. Interactions for the editor can include:

1. Base level dialog functionality including help, close, OK and Cancel are standard dialog behaviors for a modal dialog.

2. Creation and Initialization. On initial entry, the Source Class member properties 430 associated with the primary keys in the database are pre-populated into drop down combos. There is generally one empty drop down combo at 450 available for the user to enter an additional member property.

3. The Group Scroll Bar 450 only need appear if the total number of elements moves beyond the bottom of the screen.

4. If a property is selected more than once for each data class, an error dialog can be displayed.

5. If properties in a pair do not have matching types, an error dialog can be displayed.

Figure 5:
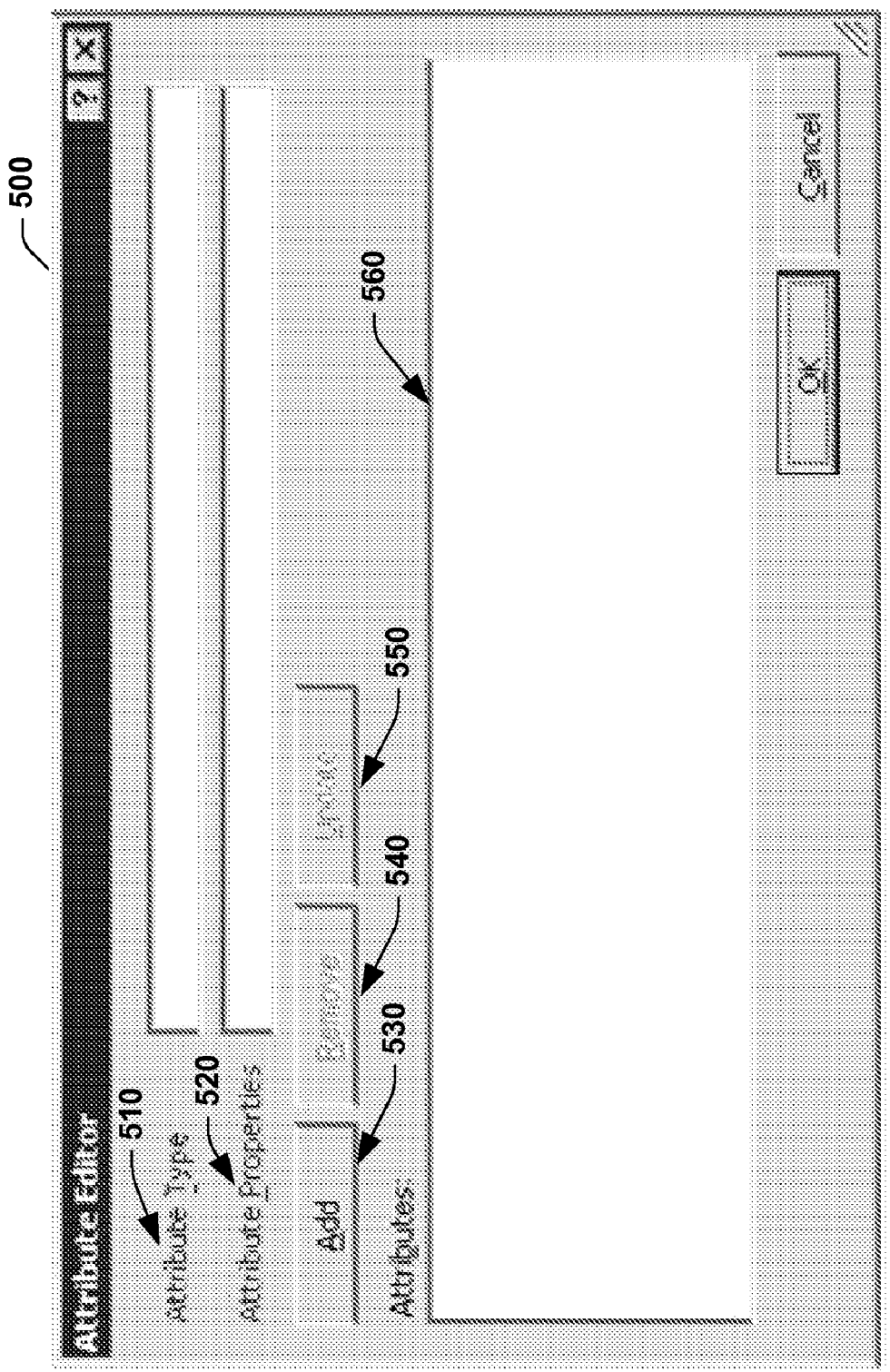
FIG. 5 illustrates an example custom attribute editor.

6. If there is at least one pair that does not have both properties specified, the Ok button at 470 can be disabled Referring now to FIG. 5, an example custom attribute editor 500 is illustrated. The Custom Attribute Editor 500 allows a user to specify a set of attributes that can be generated for a given class or member property. Graphic elements on this dialog (i.e., not including title, help icon, close icon, OK, and Cancel) include an Attribute Type edit control at 510 and an Attribute Properties edit control at 520. An Add attribute button 530 can be provided along with a Remove attribute button 540, an Update attribute button 550, and an Attributes List box at 560. This list box 560 holds the list of attributes that can be generated. It shows the attributes in the form, and order (the order they appear in the list box), that they will be generated (e.g., "Attribute(argument1, argument2)". Interactions for the editor 500 include:

1. Base level dialog functionality including help, close, OK and Cancel are standard dialog behaviors for a modal dialog.

2. Creation and Initialization. On initial entry, the Attribute list box 560 is empty and focus is placed in the Attribute Type edit control. The Add 530 and the Remove buttons 540 are dimmed. When the user starts typing a legal attribute (e.g., a single legal character in the attribute type control, the Add button 530 is enabled. The user can "add" the entry at any point.

3. Re-entry into a populated Attribute List. When the user brings up the Attribute List Box 560 that has already been populated with a set of entries, the list is shown in the list box but no item is selected. Like Creation and Initialization above, the Attribute Type 510 and Attribute Property edit controls 520 are enabled. The Add and Remove buttons are dimmed. This sets the user up for entry of a new property. When the user starts typing, the Add button 530 is enabled.

4. Editing and Removal. When a set of legal attributes have been added, the user can scroll up and down the list box 560 and the contents of the list box. As an attribute and its properties are selected in the list box, they are displayed in the Attribute Type 510 and Attribute Property edit fields 520 respectively. The Remove button 540 is then highlighted. If the user selects Remove 540, the item is removed from the list and focus in the list box 560 moves to the next item. If the user begins to make a change to an existing attribute type or its property, the Remove button 540 is dimmed and the Add 530 and the Update buttons 550 are highlighted. If the user selects backspace or otherwise puts the Attribute Type text and its property back in its original state, the Add 530 and Update buttons 550 are dimmed and the Remove button 540 is highlighted again. If the attribute has illegal characters in it, an Add Attribute error message can be displayed.

Figure 6:
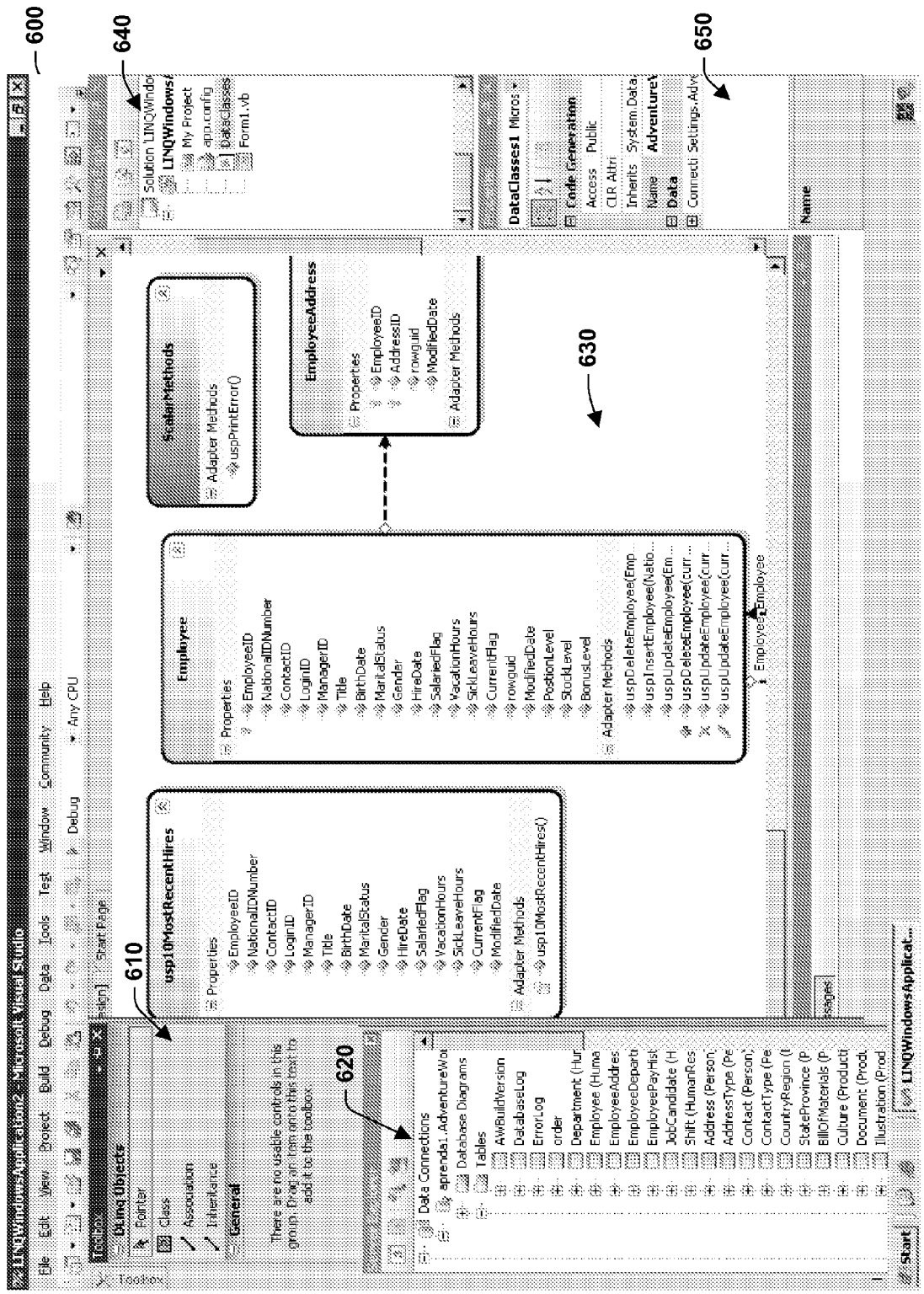
FIG. 6 illustrates an example class designer workspace.

Turning to FIG. 6 an example class designer workspace 600 is illustrated. In general, an object relational (O/R)

designer allows users to define an object model and map it to a database. In some examples, the designer generates code for:

1. A set of typed classes that map to tables and stored procedures.

2. A typed data context class—Used to pull and push object to the database.

3. A mapping between the classes and the database (via code attributes, XML file, and so forth). As can be appreciated, other design features can be provided with the workspace 600.

At 610, a Tool Box with O/R Designer objects can be provided. A Sever Explorer component can be provided at 620 showing object locations and an O/R Designer surface is provided at 630. A Solution Explorer 640 can be provided along with a Property window 650. An end-to-end scenario enabled by the O/R Designer is the ability to create Object Class to Relational code file with a designer. Without this feature, a developer must hand-code the entire set of files necessary for Object to Relational Code. Before proceeding it is noted that one or more of the following definitions can apply:

O/R—Object to Relational. This term refers to mapping technologies such as Linq to SQL for example that provide a programmatic run-time map between relational databases objects (such as tables and columns) and program objects (such as classes and properties).

Linq to SQL—Linq for databases. This is an example Object to Relational technology.

MProp—Member Property. Classes (e.g., 'Person'), as they exist in code, can have member properties (e.g., 'First-Name'). Classes, as they exist on a designer, can also have a different type of property that governs, for instance, how the class is generated into code (e.g., 'Access Modifier').

Figure 7:
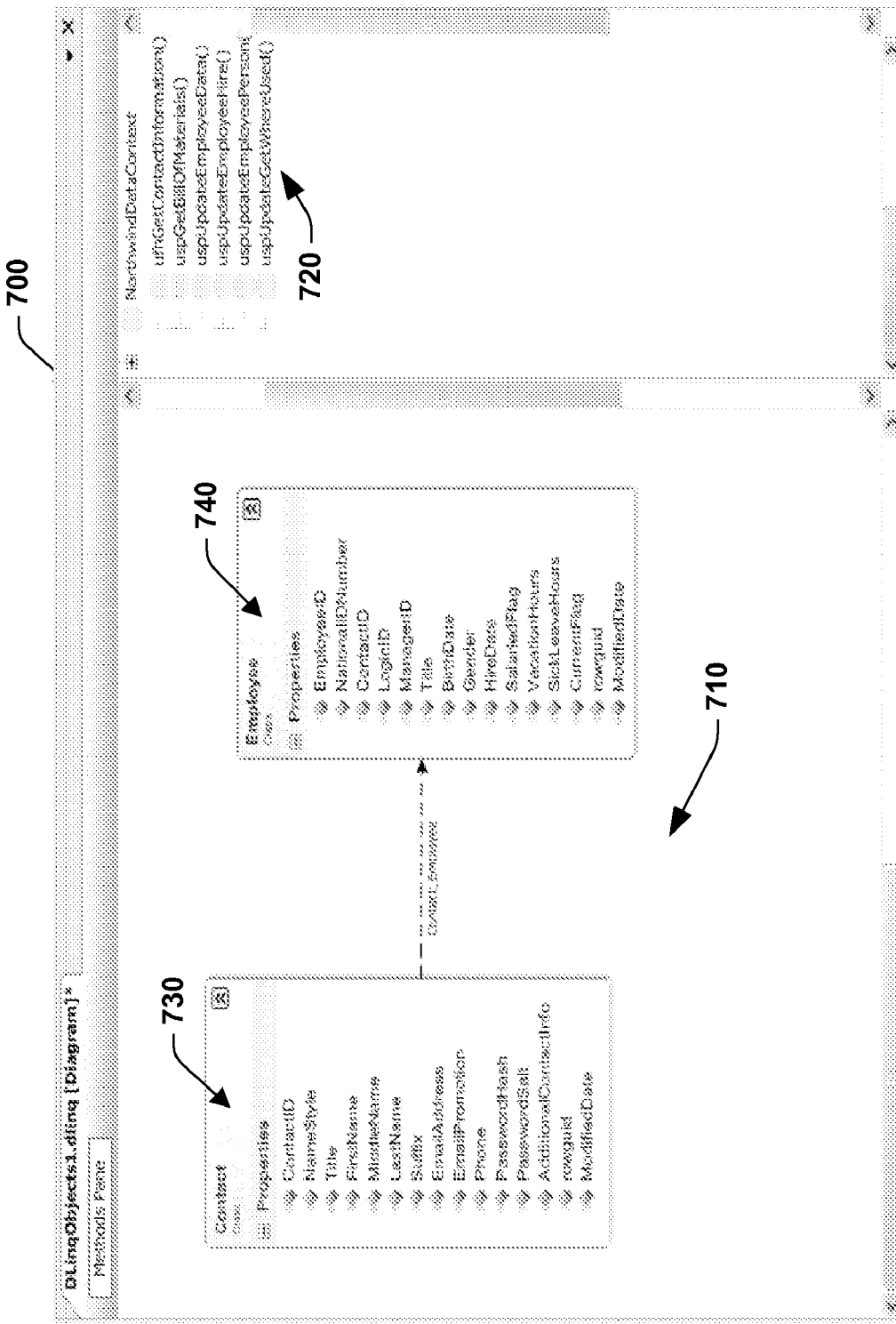
FIG. 7 illustrates design space for class methods.

Referring to FIG. 7, an example design space for class methods is illustrated. A graphical designer environment such as shown at 700 includes a number of specific objects and interactions over those objects. In one example, an O/R Designer can have at least two design panes, an entities pane 710 and a methods pane 720, each representing a different part of the model. Users can have the panes open or just the entities pane 710 open if desired. Generally, the entities pane should not be hidden.

The entities pane 710 shows class shapes representing entities in the model. The background of the entities pane 710 is the graphic object that represents the Data Context. The data context is the class that operates with the database. The data context understands about the connection, the specific database, and so forth. It is the data context that has the ability to retrieve objects, insert, update, and/or delete them as needed. In this example, a contact class 730 is shown connected to an example employee class. Generally, an O/R designer instance communicates to one database but other connections are possible. This reflects how the underlying data context works. In order to map objects against other databases, users can add additional designers to the project. As previously noted, the entities pane 710 generally cannot be hidden. When the designer is empty of all classes, it displays a message on the designer background to help prompt the user to drag classes from the Server Explorer shown above in FIG. 6. The methods pane 720 includes one or more methods under data context created form stored procedures and functions. This pane 720 can be turned on or off as desired.

Figure 8:
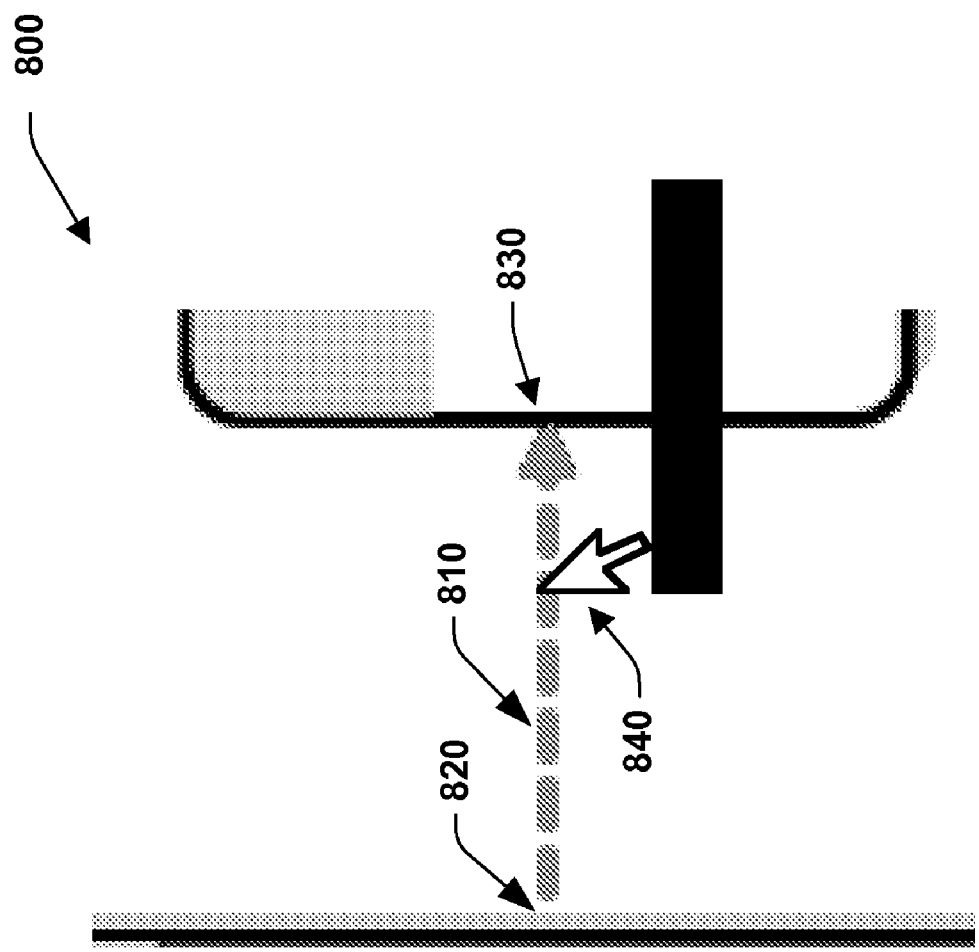
FIG. 8 illustrates an example of object/relational associations in a visual workspace.

FIG. 8 illustrates an example of object/relational (O/R) associations in a visual workspace. O/R association objects in the designer are associations between classes in the Object to Relational code file. FIG. 8 is an example is of an association between two classes (classes only partially shown and more than two classes can be developed). At 810, an O/R association shape is illustrated which in this example is a dashed arrow but other shapes can be employed. This basic shape is provided as part of a runtime environment. Note that this shape can be similar in theme to a class designer arrow. At 820, an O/R parent connection end is shown whereas at 830 an O/R child connection end is shown. At 840, a Tool tip shows textually, what the association relationships are. In this example, the parent class on the left is Order and the child class on the right is Order Detail. The following interactions can apply:

1. Base level runtime functionality including selection, mouse-over highlights, mouse and keyboard moves, cut, paste, undo, redo, individual element selection, collapse and expand of sections, and so forth can be provided by the a runtime engine. Additive functionality can be specified with appropriate call-outs to the contextual runtime behavior where appropriate.

2. Creation. A user can create an O/R association by first selecting a class on the diagram. Then, the user opens the Tool box and selects the Association shape. This will change the mouse cursor to an association icon. The user then draws the association from the parent class to the target class. Alternatively, the user can bring up the context menu on the class and choose "Insert Association". This will bring up the New Association Dialog. The user can select a child class, choose OK, and an association will be created between the two classes.

3. Deletion. A user can delete an O/R Association by selecting it and selecting the DELETE key or choosing a CUT operation (from the main or context menu).

4. Editing. The user can edit the O/R association by using the property grid or by double clicking on the association arrow to bring up the Association Editor.

5. Tool tip. The tool tip shows the relationship textually.

The form for the first line can be:

<Parent Class Name>.<MemberProperty>-><Child Class Name>

Second line is:

<Parent Class Name><-<Child Class Name>.<Member Property>

Figure 9:
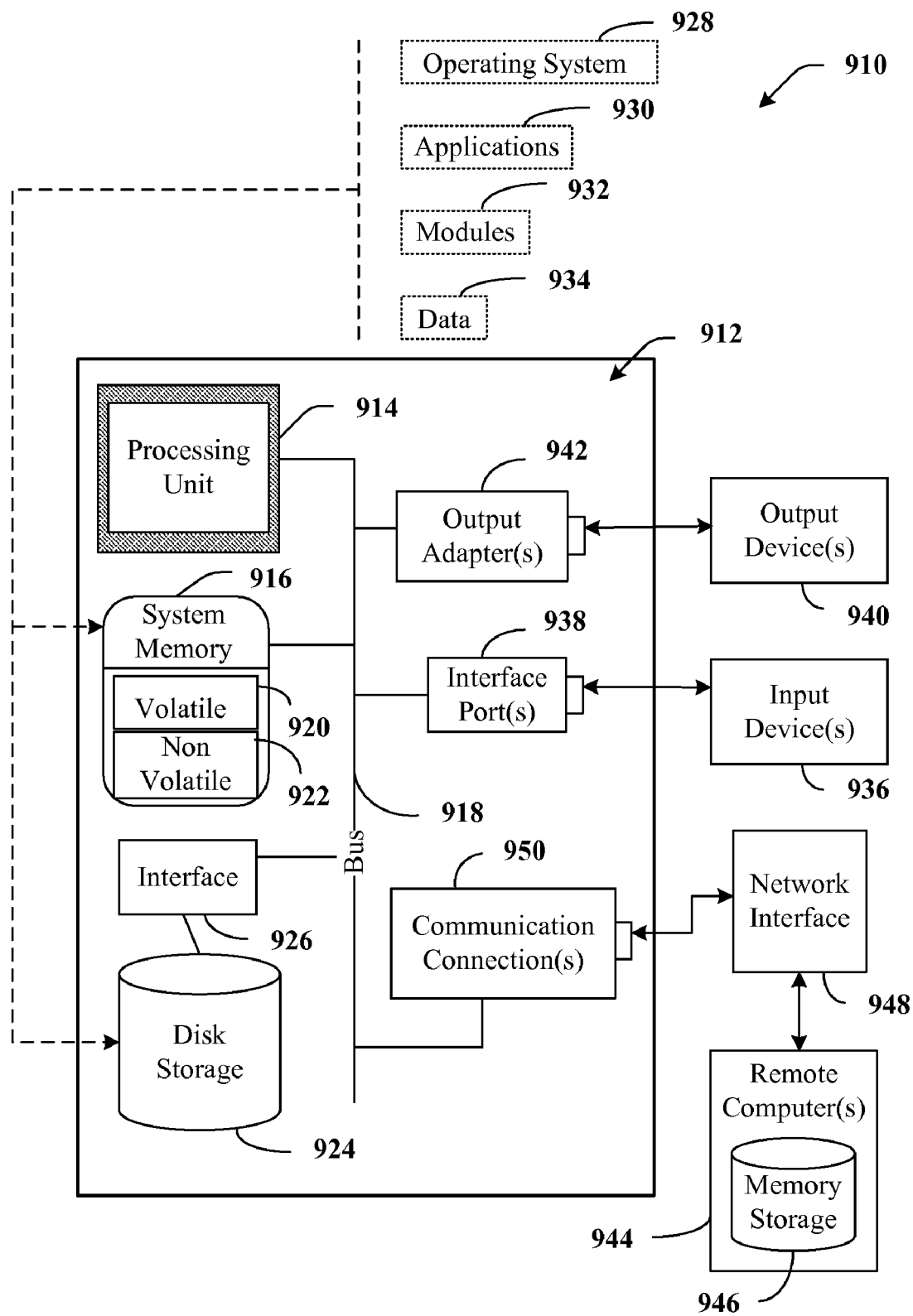
FIG. 9 is a schematic block diagram illustrating a suitable operating environment.
Figure 10:
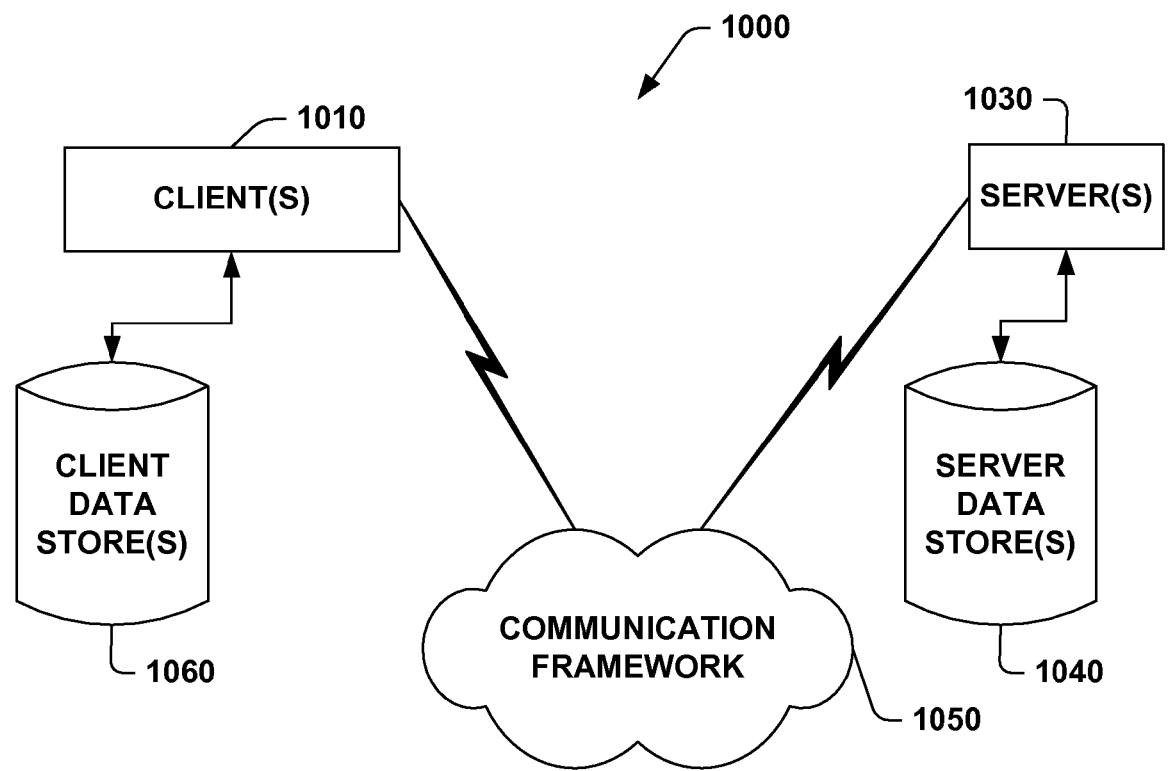
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during startup, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, performed by one or more processors of one or more computers, for automatically creating associations between two class objects upon creation of a class object from a database object as part of an object/relational mapping action, the method comprising:
    receiving input that introduces a first database object onto a visual workspace, wherein the visual workspace displays a second class object that represents a second database object from which the second class object has been mapped as part of an object/relational mapping;
    in response to the input, automatically creating and displaying a first class object to represent the first database object to create an object/relational mapping between the first database object and the first class object;
    automatically determining that the first database object contains a foreign key relationship to the second database object; and
    creating and displaying a class association between the first and second class objects to represent the foreign key relationship between the first and second database objects.

2. The method of claim 1, wherein receiving input that introduces the first database object onto the visual workspace comprises receiving input that drags and drops the first database object onto the visual workspace.

3. The method of claim 1, wherein receiving input that introduces the first database object onto the visual workspace comprises receiving input via a wizard that selects the first database object.

4. The method of claim 1, wherein the first and second database objects are database tables.

5. The method of claim 1, wherein the class association comprises creating a collection, in the second class object, to represent the first class object, and creating a pointer, in the first class object, to point to the second class object.

6. The method of claim 1 further comprising:
    receiving user input that specifies attributes that are to be included in the first class object when it is created from the first database object.

7. The method of claim 6, wherein the attributes include custom attributes.

8. The method of claim 1, wherein the class association is displayed as an arrow that points from the first class object to the second class object in the visual workspace.

9. The method of claim 1, further comprising:
    displaying a third class object on the visual workspace, the third class object representing a third database object from which the third class object has been mapped as part of an object/relational mapping;
    receiving input at the visual workspace that requests that a class association be created between the first or second class object and the third class object;
    automatically creating the class association between the third class object and the first or second class object; and
    automatically mapping the created class association to a foreign key relationship between the third database object and the first or second database object.

10. The method of claim 9, wherein receiving input comprises selecting the third class object first and then the first or second class object to draw a line from the third class object to the first or second class object to create a parent/child class association between the third class object and the first or second class object.

11. One or more computer storage media which store computer executable instructions which when executed by one or more processors of one or more computers perform a method for automatically creating associations between two class objects upon creation of a class object from a database object as part of an object/relational mapping action, the method comprising:
    receiving input that introduces a first database object onto a visual workspace, wherein the visual workspace displays a second class object that represents a second database object from which the second class object has been mapped as part of an object/relational mapping;
    in response to the input, automatically creating and displaying a first class object to represent the first database object to create an object/relational mapping between the first database object and the first class object;
    automatically determining that the first database object contains a foreign key relationship to the second database object; and
    creating and displaying a class association between the first and second class objects to represent the foreign key relationship between the first and second database objects.

12. The one or more computer storage media of claim 11, wherein receiving input that introduces the first database object onto the visual workspace comprises receiving input that drags and drops the first database object onto the visual workspace.

13. The one or more computer storage media of claim 11, wherein receiving input that introduces the first database object onto the visual workspace comprises receiving input via a wizard that selects the first database object.

14. The one or more computer storage media of claim 11, wherein the first and second database objects are database tables.

15. The one or more computer storage media of claim 11, wherein the class association comprises creating a collection, in the second class object, to represent the first class object, and creating a pointer, in the first class object, to point to the second class object.

16. The one or more computer storage media of claim 11 further comprising:
    receiving user input that specifies attributes that are to be included in the first class object when it is created from the first database object.

17. The one or more computer storage media of claim 16, wherein the attributes include custom attributes.

18. The one or more computer storage media of claim 11, wherein the class association is displayed as an arrow that points from the first class object to the second class object in the visual workspace.

19. The one or more computer storage media of claim 11, further comprising:
  displaying a third class object on the visual workspace, the third class object representing a third database object from which the third class object has been mapped as part of an object/relational mapping;
  receiving input at the visual workspace that requests that a class association be created between the first or second class object and the third class object;
  automatically creating the class association between the third class object and the first or second class object; and
  automatically mapping the created class association to a foreign key relationship between the third database object and the first or second database object.

20. The one or more computer storage media of claim 19, wherein receiving input comprises selecting the third class object first and then the first or second class object to draw a line from the third class object to the first or second class object to create a parent/child class association between the third class object and the first or second class object.

* * * * *